United States Patent
Sydir et al.

(10) Patent No.: US 9,923,891 B2
(45) Date of Patent: Mar. 20, 2018

(54) HUMAN BODY COMMUNICATION DEVICE WITH SECURE ACCESS

(71) Applicant: Intel Corporation, Santa Clara, CA (US)

(72) Inventors: Jaroslaw J. Sydir, San Jose, CA (US); Anand S. Konanur, San Jose, CA (US); Ulun Karacaoglu, San Diego, CA (US); Anthony G. LaMarca, Seattle, WA (US); Stephen R. Wood, Beaverton, OR (US); Jeremy Burr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 155 days.

(21) Appl. No.: 14/751,233

(22) Filed: Jun. 26, 2015

(65) Prior Publication Data
US 2016/0381012 A1 Dec. 29, 2016

(51) Int. Cl.
H04L 29/06 (2006.01)
H04B 13/00 (2006.01)
H04W 4/00 (2018.01)
H04W 12/06 (2009.01)

(52) U.S. Cl.
CPC ....... *H04L 63/0861* (2013.01); *H04B 13/005* (2013.01); *H04W 4/008* (2013.01); *H04W 12/06* (2013.01)

(58) Field of Classification Search
CPC .... H04L 63/0861; H04L 63/10; H04B 13/005
See application file for complete search history.

(56) References Cited

U.S. PATENT DOCUMENTS

| 7,202,773 B1* | 4/2007 | Oba .................. G07C 9/00007 340/5.8 |
|---|---|---|
| 2009/0094681 A1 | 4/2009 | Sadler et al. |
| 2011/0227856 A1 | 9/2011 | Corroy et al. |
| 2013/0019292 A1 | 1/2013 | Varshaysky et al. |
| 2013/0142363 A1 | 6/2013 | Mento et al. |
| 2014/0085050 A1* | 3/2014 | Luna .................. G07C 9/00087 340/5.82 |
| 2014/0279566 A1* | 9/2014 | Verma .................. G06Q 20/322 705/76 |

OTHER PUBLICATIONS

International Search Report and Written Opinion for International Patent Application No. PCT/US2016/033901, dated Aug. 16, 2016, 11 pages.
International Preliminary Report on Patentability for International Patent Application No. PCT/US2016/033901, dated Jan. 4, 2018, 8 pages.

* cited by examiner

*Primary Examiner* — Tri Tran
(74) *Attorney, Agent, or Firm* — Jordan IP Law, LLC

(57) ABSTRACT

Systems, apparatuses, and methods may include a human body communication data storage device having at least first and second electrodes and a human body communication modem. A storage component communicating with the human body communication modem includes a first secure storage location provided with a user-specific authentication record and a second data storage location.

20 Claims, 4 Drawing Sheets

HUMAN BODY COMMUNICATION DEVICE WITH SECURE ACCESS

TECHNICAL FIELD

Embodiments generally relate to human body communication. More particularly, embodiments relate to human body communication storage devices with secure access.

BACKGROUND

Human body communication is a communication technology in which a signal is coupled directly onto a human body through a transmission electrode; it is transmitted over the body to its destination. The signal may be delivered to an external device via a body member contacting a receiving pad on the device. Human body communication transmission electrodes and receiving electrodes typically touch the skin or are in close proximity to the skin. There may be no interference between human body communication transmissions on one person's body and those on another person's body, even if the bodies are located in close proximity. Thus, applications for human body communication include use as a general purpose body area network communications technology or as an extension of near field communication technology.

Data may be transferred to and from human body communication devices as users share documents or files. In some cases, an unauthorized user may have access to data stored on the human body communication device.

BRIEF DESCRIPTION OF THE DRAWINGS

The various advantages of the embodiments will become apparent to one skilled in the art by reading the following specification and appended claims, and by referencing the following drawings, in which:

FIG. 3 is a flowchart of an example of a method according to an embodiment.

DESCRIPTION OF EMBODIMENTS

Figure 1:
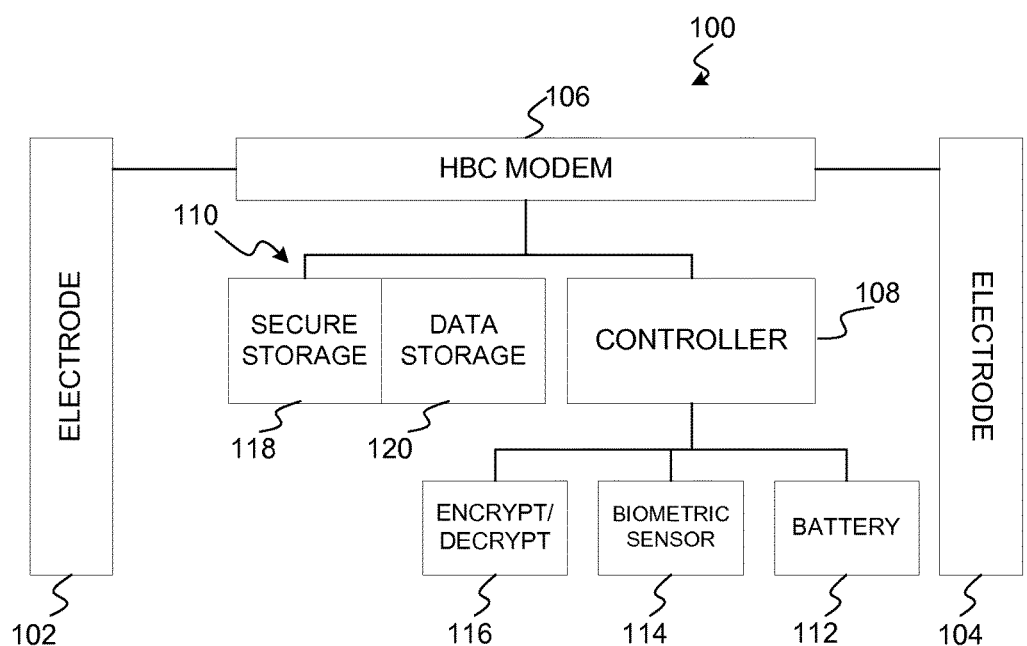
FIG. 1 is a schematic diagram of an example of a human body communication storage device.

Turning to the drawings in detail, FIG. 1 depicts an example of a human body communication (HBC) storage device 100 according to an embodiment. A first electrode 102 typically faces towards a user's body while a second electrode 104 typically faces away from the user's body. The first electrode 102 and the second electrode 104 may electrically communicate with a modem 106 either directly or through intermediate components. The modem 106 may include, among other components, a transmission buffer, transmitter, receiver, and receiving buffer. The modem 106 may be connected to a controller 108 and to storage 110. The controller 108 and storage 110 may also be connected to each other and optionally included in the modem 106. Optionally, the human body communication storage device 100 may include a power source such as battery 112, a biometric sensor 114, and a security module 116 that includes encryption and decryption capabilities.

Illustrated storage 110 includes a secure storage component 118 and a data storage component 120. In operation, the secure storage component 118 is typically provided with a user-specific authorization record while data to be transferred to external devices is stored in the data storage component 120. As will be discussed below, the inclusion of a user-specific authorization record may ensure that an unauthorized third party cannot gain access to the human body communication storage device 100, put it on, and touch an external device to read the data stored in the data storage component 120.

Figure 2:
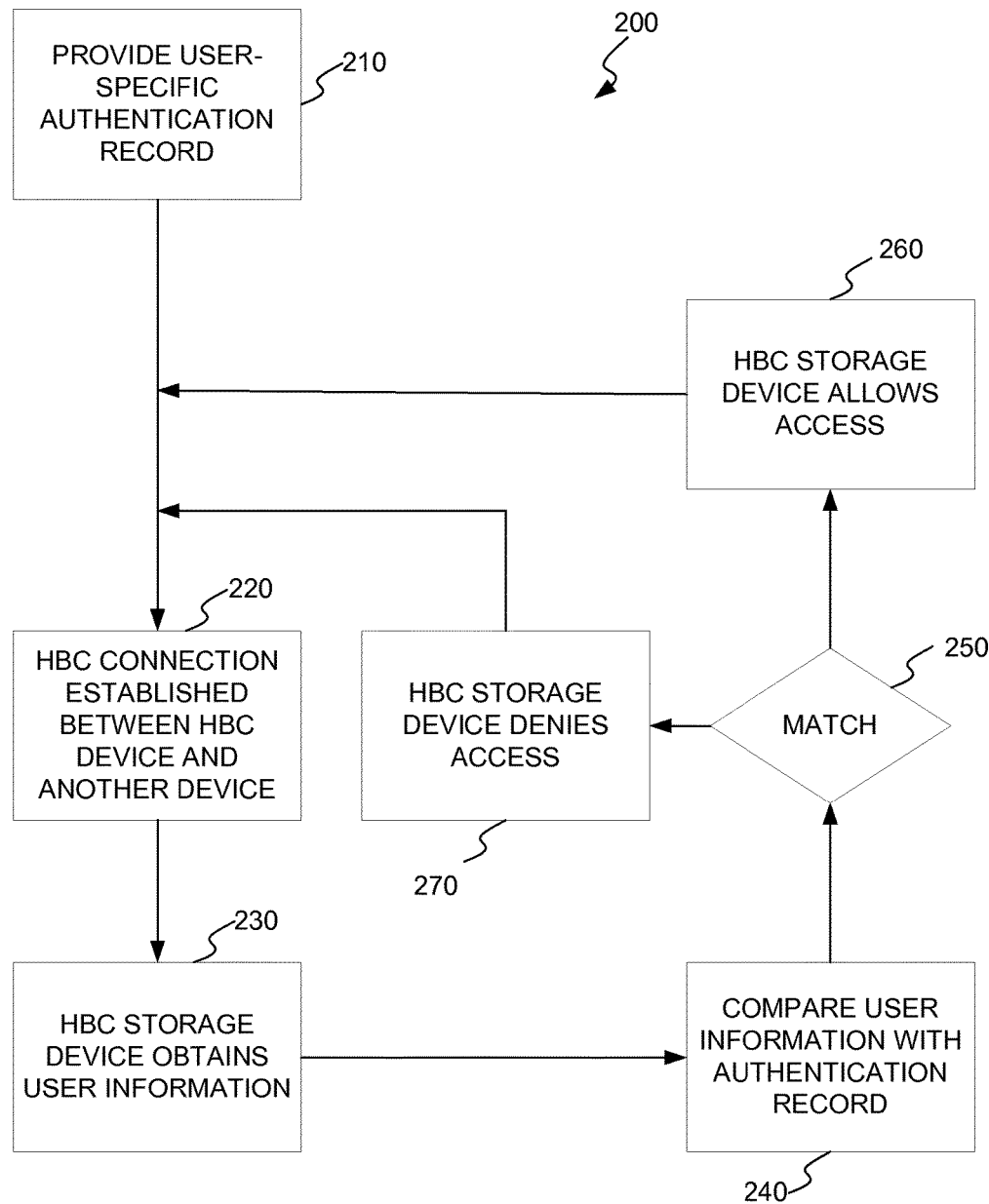
FIGS. 2 and 3 are flowcharts of examples of methods of ensuring that a human body communication storage device has secure access by an authorized user according to an embodiment.
Figure 3:
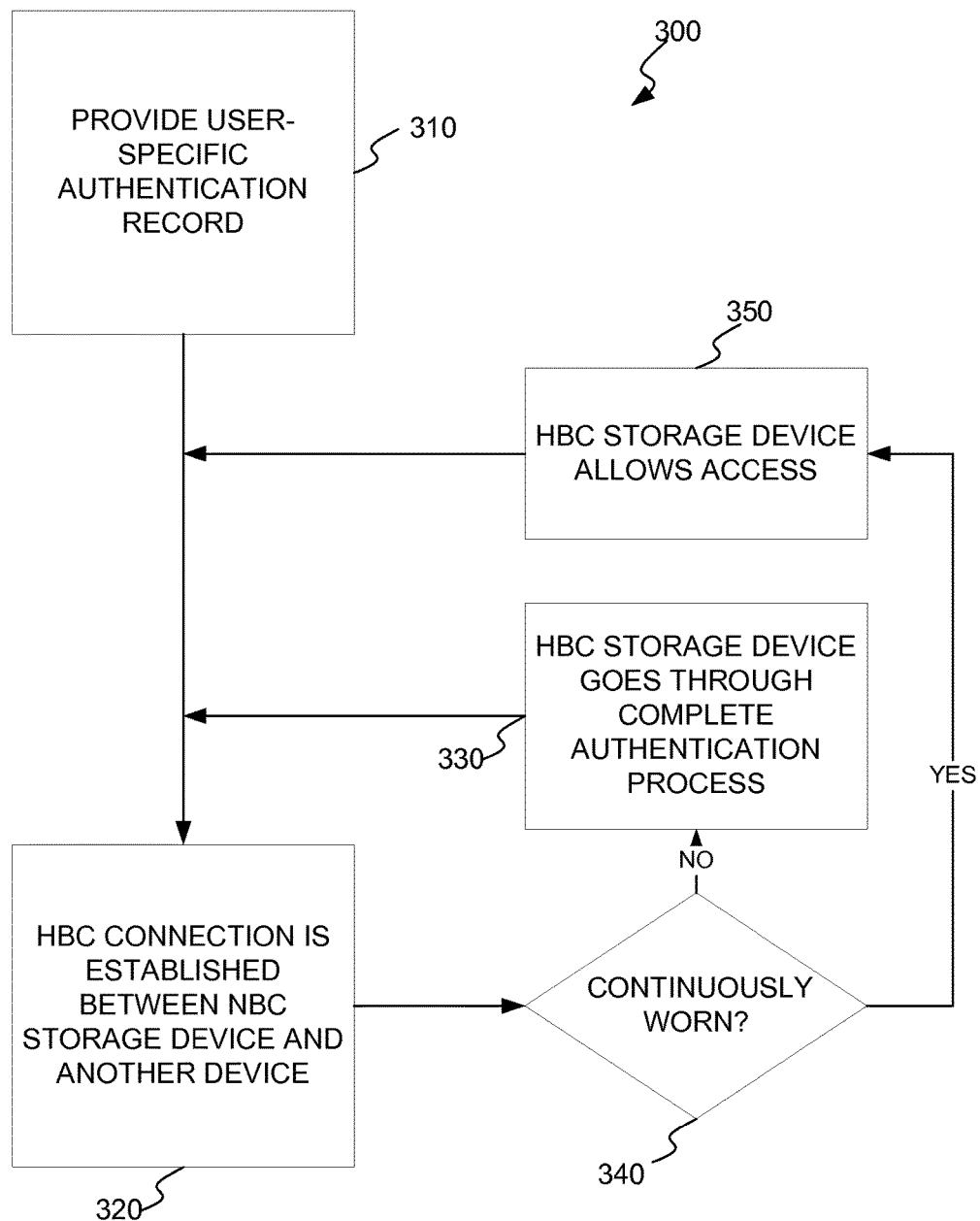

FIGS. 2 and 3 show exemplary authentication methods 200 and 300, respectively, of ensuring that the human body communication storage device 100 has secure access by an authorized user. The methods 200 and 300 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in methods 200 and 300 may be written in any combination of one or more programming languages, including an object oriented programming language such as Java, Smalltalk, C++ or the like and conventional procedural programming languages, such as the "C" programming language or similar programming languages.

With continued reference to FIGS. 1-3, in block 210 of the method 200, a user-specific authorization record that identifies the user is provided in the secure storage component 118. The record may be one or more biometric markers that uniquely identify the user or a password or passphrase known only to the user. Exemplary biometric markers include fingerprints, palmprints, bioimpedances, voice data, facial recognition patterns, blood vessel patterns, retinal scans, iris scans, heart rhythm records (e.g., electrocardiogram/EKG) or any unique user attribute that may be sensed and recorded. Alternatively, a marker may be implanted into or ingested by the user and the implanted/ingested marker may be sensed to identify the user. Examples include RFIDs and microchips but are not limited thereto.

In block 220, a user of the human body communication storage device 100 may initiate communication with an external device by, for example, touching an external device capable of receiving human body communications. In illustrated block 230, the human body communication storage device 100 obtains information from the user. This information may be biometric information sensed by biometric sensor 114 or may be biometric information sensed by the external device and communicated to the human body communication storage device 100. Alternatively, the user may input a password or passphrase to the external device that is communicated to the human body communication storage device 100.

The human body storage communication device 100 may compare the information obtained from the user with the stored user-specific authorization record in block 240. At block 250 it is determined whether the obtained information matches the stored user-specific authorization record. If a match is determined, the human body communication storage device 100 may permit access to the data stored in data storage component 120 in block 260. If no match is determined, data access is denied in illustrated block 270.

In use, the authentication method 200 may be performed each time the user encounters a different external device or each time data access is desired. Alternatively, the method 300 of FIG. 3 may be used. In FIG. 3, at processing block 310, the human body communication storage device 100 may be provided with the user-specific authentication record. In processing block 320, the authentication method 200 may be performed and communication may be established between the human body communication storage device 100 and an external device when there is an information match to the user-specific authentication record.

In illustrated block 340, the human body communication storage device 100 determines whether it has been worn by the user continuously since the last authentication method 200 was performed. This determination may be made through sensors, such as the biometric sensor 114 or other optional sensors provided on the human body communication storage device 100. In an exemplary technique, a loss of EKG or heart rhythm reading or a significant change in bioimpedance reading would indicate that the device 100 has been removed by a user. If it is determined that the device has been worn continuously since the last authentication method 200 was performed, the human body communication storage device 100 may permit data access to the data storage component 120 in process block 350 without performing additional authentication. If it is determined that the storage device 100 has not been worn continuously since the last authentication method was performed, the storage device 100 goes through a complete authentication method 200 before allowing access to data in illustrated block 330.

A variety of data may be stored on the human body communication storage device 100. Data stored on the human body communication storage device 100 may be classified based on who owns and/or access the data. For example, data stored in the data storage component 120 may be owned by and accessible to the user directly. This might include personal data, data files, or personal credentials such as an encryption key used to encrypt files sent to a secure print service. This data is written to and read from the human body communication storage device 100 by the user.

In contrast, data stored in the secure storage component 118 may be data placed there by a third party for use of the user. An example of such data is information including the user's account numbers and biometrics written to the secure storage component 118 by a bank. This information is owned by the user but is not directly accessed by the user. Typically, the information is encrypted by the third party (such as a bank) so that access to it cannot be gained directly. It may be accessed by point of sale terminals and other payment devices on behalf of the user.

Note that different user-specific authentication records may be used to authenticate the user depending upon the particular external device with which communication is to be established. That is, each third-party may provide its own user authentication record for that user, to control access to that third-party's data on storage device 100. The user authentication record may be provided at secure storage component 118 while the data may be provided at data storage component 120. For example, the human body communication storage device 100 may be configured so that data owned by the user is secured using a heart rhythm monitor with the biometric sensor 114 being a heart rhythm monitor used in the authentication process 200. Data owned by the user's bank might be secured using fingerprint data provided to device 100 via an external device such as a payment terminal. Thus multiple user-specific authentication records may be provided to the secure storage component 118 to permit access to different data items in data storage component 120.

Figure 4:
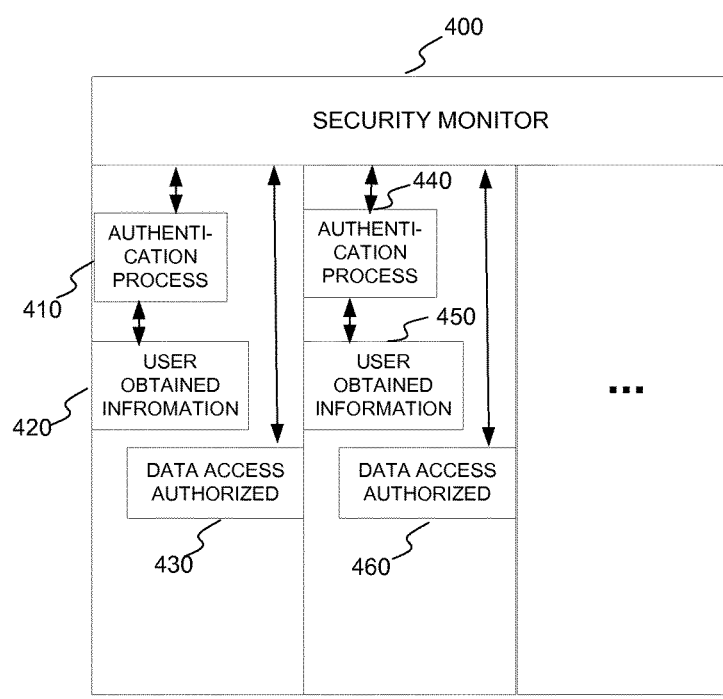
FIG. 4 is an illustration of an example of a use of multiple user-specific authentication records according to an embodiment.

FIG. 4 depicts the use of multiple user-specific authentication records. A security monitor 400 partitions the secure storage component 118 into plural user-specific authentication records, each of which permits access to a corresponding set of data in the data storage component 120. For example, for access to a first set of data, authentication process 410 is performed (selected from authentication method 200 or 300 in FIG. 2 or 3, respectively) using a first set of user-obtained information 420 that is compared to the stored user-specific authentication record. If there is a match, data access to the first set of data is granted at illustrated block 430. Similarly, for access to a second set of data, authentication process 440 is performed (selected from authentication method 200 or 300 in FIG. 2 or 3, respectively) using a second set of user-obtained information 450 that is compared to a further stored user-specific authentication record. If there is a match, data access to the second set of data is granted at illustrated block 460. Note that there may be any number of different data sets using different combinations of user-specific authentication records and information obtained from the user.

Further, the authentication procedures may be nested. For example, the human body communication storage device 100 may be configured to use heart rhythm data sensed by sensor 114 for authentication to all data sets and a bank could also require fingerprint information from the user at a pay terminal.

Advantageously, human body communication described in the embodiments may have a variety of applications depending upon the specific data that is transmitted. Transmitted data may be information such as text from a document that is temporarily stored on the human body communication storage device (after being copied) and then transferred to another touch device such as a computer, smart phone, or tablet. Similarly it may be a URL (Uniform Resource Locator) that is later copied to another device or geo-coordinates that are later copied to a GPS (Global Positioning System) navigation unit. Data may be a prescription written to the device by a doctor and retrieved by a pharmacy, or bank account information written to the device by a bank and retrieved and modified at a point of sale terminal. Similarly, it may be an encryption key that was used to encrypt a file sent to a public printer that is retrieved by the printer to decrypt the file. Numerous other encryption key scenarios are possible.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Additional Notes and Examples

Example 1 may include a human body communication data storage device having least first and second electrodes, a human body communication modem communicating with the at least first and second electrodes, and a storage component communicating with the human body communication modem, the storage component including a first secure storage location and a second data storage location.

Example 2 may include the device of example 1 where the human body communication modem further comprises a transmitter and a receiver.

Example 3 may include the device of examples 1 or 2 further comprising a controller coupled to the human body communication modem, wherein the storage component is coupled to the controller and the modem.

Example 4 may include the device of example 1 further comprising one or more biometric sensors.

Example 5 may include a human body communication method comprising establishing communication from a human body communication storage device to an external device, the human body communication storage device being formatted with a user-specific authorization record in a secure storage location and data in a separate storage location, obtaining information from a user of the human body communication storage device, comparing the information obtained from the user with the user-specific authorization record, and permitting access to the data if the information obtained from the user matches the user-specific authorization record.

Example 6 may include the method of example 5, wherein the human body communication storage device senses the information from the user.

Example 7 may include the method of example 6, wherein the sensed information is biometric sensed information.

Example 8 may include the method of example 7, wherein the biometric sensed information is selected from a bioimpedance, a heart rhythm, or a fingerprint.

Example 9 may include the method of example 5, wherein the user provides the information to the external device.

Example 10 may include the method of example 9, wherein the information is biometric information sensed by the external device.

Example 11 may include the method of example 10, wherein the biometric information is a fingerprint, a heart rhythm, a retina pattern, a blood vessel pattern, an iris pattern, a facial recognition, or a voice pattern.

Example 12 may include the method of example 9, wherein the user enters the information into the external device.

Example 13 may include the method of examples 5 or 9, further comprising sensing whether the human body communication storage device has been continually worn by the user.

Example 14 may include the method of example 13, wherein if the human body communication storage device has been continually worn by the user, permitting access by a further external device without authentication.

Example 15 may include a non-transitory computer readable medium comprising a set of instructions which, when executed by a device, cause the device to establish communication from a human body communication storage device to an external device, the human body communication storage device being provided with a user-specific authorization record in a secure storage location and data in a separate storage location, obtain information from a user of the human body communication storage device, compare information from the user with the user-specific authorization record, and permit access to the data if the information from the user matches the user-specific authorization record.

Example 16 may include the computer readable medium of example 15 wherein the human body communication storage device senses the information from the user.

Example 17 may include the computer readable medium of example 16 wherein the sensed information is biometric information.

Example 18 may include the computer readable medium of example 17 wherein the biometric sensed information is selected from a bioimpedance, a heart rhythm, or a fingerprint.

Example 19 may include the computer readable medium of example 15 comprising further instructions, which, when executed, cause the device to sense whether the human body communication storage device has been continually worn by the user.

Example 20 may include the computer readable medium of example 15 wherein if the human body communication storage device has been continually worn by the user, permitting access by a further external device without authentication.

Example 21 may include an apparatus for human body communication comprising means for establishing communication from a human body communication storage device to an external device, the human body communication storage device being provided with a user-specific authorization record in a secure storage location and data in a separate storage location, means for obtaining information from a user of the human body communication storage device, means for comparing obtained information from the user with the user-specific authorization record, and means for permitting access to the data if the information obtained from the user matches the user-specific authorization record.

Example 22 may include the apparatus of example 21 further comprising means for sensing the information from the user.

Example 23 the apparatus of example 22 wherein the sensed information is biometric information.

Example 24 may include the apparatus of example 23 wherein the biometric sensed information is selected from a bioimpedance, a heart rhythm, or a fingerprint.

Example 25 may include the apparatus of example 21 further comprising means for sensing whether the human body communication storage device has been continually worn by the user.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A human body communication data storage device comprising:
    at least first and second electrodes;
    a human body communication modem communicating with the at least first and second electrodes;
    a storage component communicating with the human body communication modem, the storage component including a first secure storage location provided with a plurality of user-specific authorization records and a second data storage location to contain a plurality of corresponding data items; and
    a security module that is to compare at least one form of biometric information of a plurality of forms of biometric information that are to be obtained from a user with at least one of the plurality of user-specific authorization records to determine access to a corresponding data item of the plurality of corresponding data items contained in the second data location, wherein different forms of biometric information provide access to different data items.

2. The device of claim 1, where the human body communication modem further comprises a transmitter and a receiver.

3. The device of claim 1, further comprising:
    a controller coupled to the human body communication modem, wherein the storage component is coupled to the controller and the modem.

4. The device of claim 3, further comprising:
    one or more biometric sensors coupled to the controller.

5. A human body communication method comprising:
    establishing communication from a human body communication storage device to an external device, the human body communication storage device being provided with a plurality of user-specific authorization records in a secure storage location and a plurality of corresponding data items in a separate storage location;
    obtaining a plurality of forms of biometric information from a user of the human body communication storage device;
    comparing at least one of the plurality of forms of biometric information obtained from the user with at least one of the plurality of user-specific authorization records, wherein the comparison occurs within the human body communication storage device; and
    permitting access to a corresponding data item from the plurality of corresponding data items if at least one of the plurality of forms of biometric information obtained from the user matches a corresponding user-specific authorization record from among the plurality of user-specific authorization records, wherein different forms of biometric information provide access to different data items.

6. The method of claim 5, wherein the human body communication storage device senses the information from the user.

7. The method of claim 6, wherein the sensed information is biometric sensed information.

8. The method of claim 7, wherein the biometric sensed information is selected from a bioimpedance, a heart rhythm, or a fingerprint.

9. The method of claim 5, wherein the user provides the information to the external device.

10. The method of claim 9, wherein the information is biometric information sensed by the external device.

11. The method of claim 10, wherein the biometric information is a fingerprint, a heart rhythm, a retina pattern, a blood vessel pattern, an iris pattern, a facial recognition, or a voice pattern.

12. The method of claim 9, wherein the user enters the information into the external device.

13. The method of claim 5, further comprising sensing whether the human body communication storage device has been continually worn by the user.

14. The method of claim 13, wherein if the human body communication storage device has been continually worn by the user, permitting access by a further external device without authentication.

15. A non-transitory computer readable medium comprising a set of instructions which, when executed by a device, cause the device to:
    establish communication from a human body communication storage device to an external device, the human body communication storage device being provided with a plurality of user-specific authorization records in a secure storage location and a plurality of corresponding data items in a separate storage location;
    obtain a plurality of forms of biometric information from a user of the human body communication storage device;
    compare at least one of the plurality of forms of biometric information obtained from the user with at least one of the plurality of user-specific authorization records, wherein the compare occurs within the human body communication storage device; and
    permit access to a corresponding data item from the plurality of corresponding data items if at least one of the plurality of forms of biometric information obtained from the user matches a corresponding user-specific authorization record from among the plurality of user-specific authorization records, wherein different forms of biometric information provide access to different data items.

16. The computer readable medium of claim 15, wherein the human body communication storage device senses the information from the user.

17. The computer readable medium of claim 16, wherein the sensed information is biometric information.

18. The computer readable medium of claim 17, wherein the biometric sensed information is selected from a bioimpedance, a heart rhythm, or a fingerprint.

19. The computer readable medium of claim 15, comprising further instructions, which, when executed, cause the device to sense whether the human body communication storage device has been continually worn by the user.

20. The computer readable medium of claim 15, wherein if the human body communication storage device has been continually worn by the user, permitting access by a further external device without authentication.

* * * * *